United States Patent [19]
Ogawa et al.

[11] Patent Number: 5,384,609
[45] Date of Patent: Jan. 24, 1995

[54] INTEGRATED CAMERA-TRIPOD SYSTEM

[75] Inventors: Yukio Ogawa, Yokohama; Hiroyuki Fukushima, Hoya; Rikako Mizuno, Kawasaki, all of Japan

[73] Assignee: Canon Kabushiki Kaisha, Tokyo, Japan

[21] Appl. No.: 46,520

[22] Filed: Apr. 16, 1993

Related U.S. Application Data

[63] Continuation of Ser. No. 814,056, Dec. 26, 1991, abandoned, which is a continuation of Ser. No. 517,188, May 1, 1990, abandoned.

[30] Foreign Application Priority Data

May 2, 1989 [JP] Japan .................................. 1-112240
Jul. 21, 1989 [JP] Japan .............................. 1-86020[U]

[51] Int. Cl.⁶ .......................................... G03B 29/00
[52] U.S. Cl. ...................................... 354/81; D16/244
[58] Field of Search ................ 354/81, 82, 293, 294; 352/243; D16/237, 242, 243, 244, 245; 248/166, 170, 286, 461; 358/229

[56] References Cited

U.S. PATENT DOCUMENTS

| D. 222,118 | 9/1971 | Nakatani | D16/244 |
| 2,684,822 | 7/1954 | Odin | 354/293 X |
| 4,417,796 | 11/1983 | Sigiura et al. | 354/152 |
| 4,819,016 | 4/1989 | Leonard et al. | 354/82 |

FOREIGN PATENT DOCUMENTS

61-42627  1/1986 Japan .................................. 354/266

*Primary Examiner*—Howard B. Blankenship
*Attorney, Agent, or Firm*—Fitzpatrick, Cella, Harper & Scinto

[57] ABSTRACT

A tripod-integrated camera is provided with a camera body assembly for housing a camera and a tripod body assembly for housing a tripod, the tripod body assembly is detachably attached to the camera body assembly in such a manner so as to form an elongated, substantially integral structure.

29 Claims, 7 Drawing Sheets

INTEGRATED CAMERA-TRIPOD SYSTEM

This application is a continuation division, of application Ser. No. 07/814,05 filed Dec. 26, 1991, now abandoned, which is a continuation of application Ser. No. 07/517,188 filed May 1, 1990, now abandoned.

BACKGROUND OF THE INVENTION

1. Field of Invention

The present invention relates to a tripod-integrated type of camera having a camera body assembly and a tripod body assembly which can be detachably attached to the camera body assembly.

2. Description of the Related Art

Various types of simple tripods which can be detachably attached to cameras have heretofore been known. Such simple tripods are typically arranged so that they can be attached to the bottom of a camera through screw means provided on the bottom at the camera, and both items can be carried together.

In contrast, if a general types of tripods having a panhead is to be carried with a camera, it is generally more convenient to separate the tripod from the camera and carry each item separated.

When the above-mentioned conventional type of simple tripod is to be attached to, or detached from a camera, it is necessary to perform a time-consuming operation such as the tightening or undoing of the tripod screw. In addition, since this kind of simple tripod has relatively short legs, sufficient height cannot be obtained compared to the height obtainable with the general type of tripod. Accordingly, the conventional type of simple tripod is of limited practical use.

Although the general type of tripod obtains a sufficient height, it is disadvantageous to use because it is necessary not only to manipulate a tripod screw but also to telescopically extend its three legs by hand. This type of tripod further has the disadvantage that it is too heavy and large to carry easily.

SUMMARY OF THE INVENTION

It is one object of the present invention to provide a tripod-integrated camera which is capable of solving the above-described problems, and which is advantageous in terms of portability, operability and practicability.

The present invention in one aspect features a tripod-integrated camera, comprising a camera body assembly in which a camera is disposed; and a tripod body assembly in which a tripod is disposed wherein the tripod body assembly is arranged to be detachably attached to the camera body assembly. The tripod body assembly is attached to the camera body assembly to form an elongated shape substantially integral with the camera body assembly.

The invention in another aspect features a tripod-integrated camera, comprising a camera body assembly in which a camera is disposed. A tripod body assembly in which a tripod is disposed, wherein the tripod body assembly is arranged to be detachably attached to the camera body assembly, whereby the camera body assembly forms an elongated shape substantially integral with the camera body assembly further comprises a coupling means for coupling the tripod body assembly to the camera body assembly along an axis parallel to the direction in which a film is transported in the camera body assembly.

The tripod-integrated camera may also be provided with a hinge arrangement for supporting the camera body assembly rotatably with respect to the tripod section in a plane approximately perpendicular to the photographic optical axis.

The tripod-integrated camera of the present invention may also be provided with an angle adjustment section which allows the camera body assembly to be rotated with respect to the tripod section about an axis parallel to the direction of film travel.

When the tripod section is attached to the camera body assembly, they form a substantially integral, compact cylinder which can be easily carried from one to another place. Since the camera body assembly can be rotated through 90 degrees with respect to the tripod section, the camera can easily be switched between a vertical photographic position and a horizontal photographic position.

Further objects, features and advantages of the present invention will become apparent from the following detailed description of embodiments of the present invention with reference to the accompanying drawings.

DESCRIPTION OF THE PREFERRED EMBODIMENTS

Preferred embodiments of the present invention will be explained below with reference to the accompanying drawings.

Figure 1A:
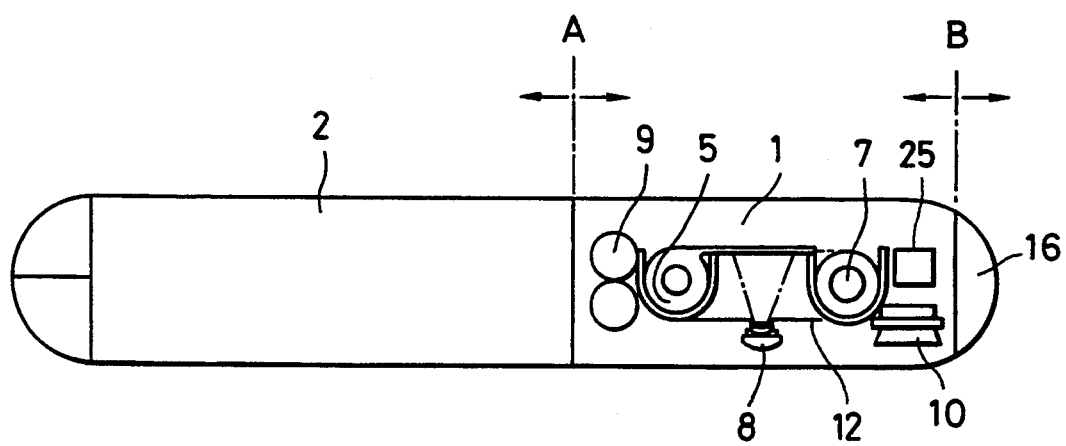
FIG. 1(a) is a schematic top plan view of a first embodiment of a tripod-integrated type of camera according to the present invention and shows the externally invisible arrangement of a camera body assembly.
Figure 1B:
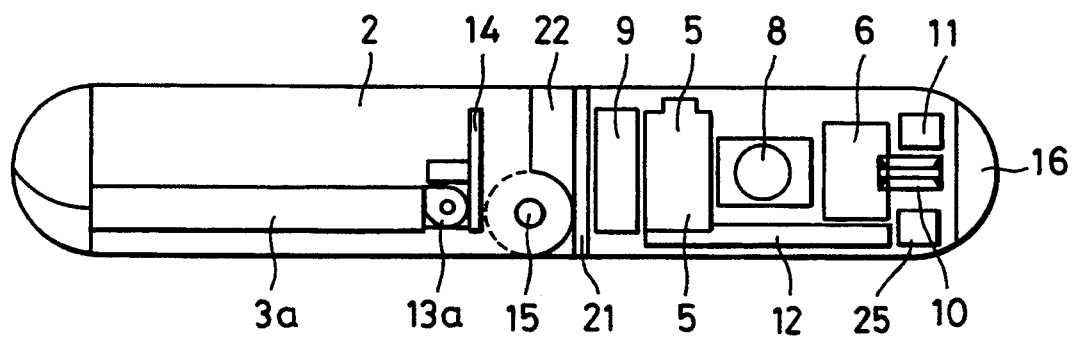
FIG. 1(b) is a schematic front elevational view of the first embodiment of FIG. 1 (a)
Figure 1C:
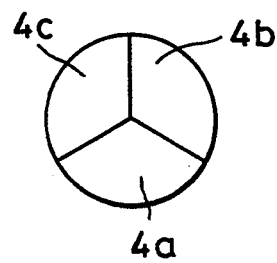
FIG. 1(c) is a schematic end view of the tripod section of the first embodiment.
Figure 2:
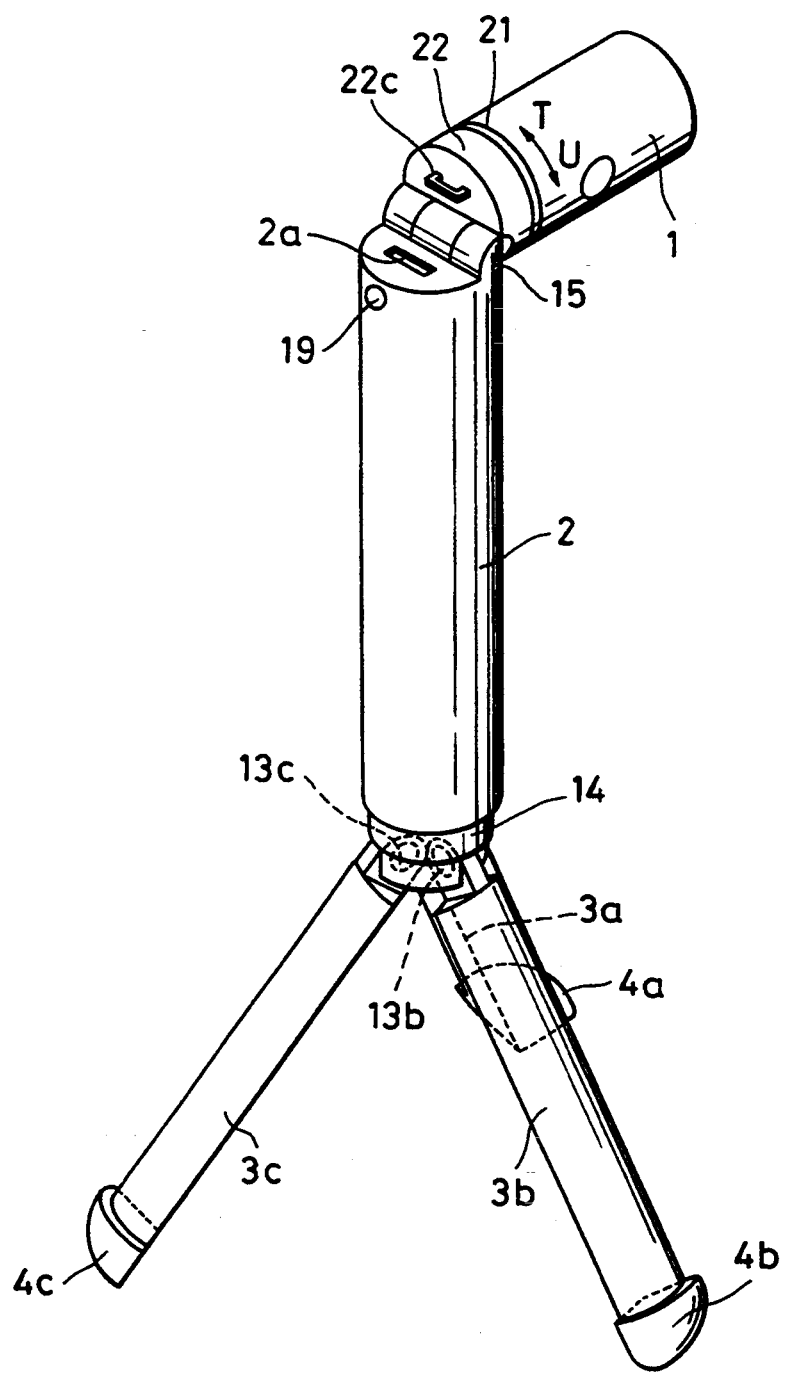
FIG. 2 is a diagrammatic perspective view of the camera of FIG. 1(a) in an upright position.

FIGS. 1(a), 1(b) and 1(c) schematically show the construction of a first embodiment of a tripod-integrated camera according to the present invention. FIG. 1(a) is a partially broken away top plan view of the first embodiment, and shows the externally invisible arrangement of a camera body assembly. FIGS. 1(b) and 1(c) are a front elevational view and a left-side end view showing the first embodiment, respectively. FIG. 2 is a perspective view showing the tripod-integrated camera which stands in an upright position.

In the drawings, the illustrated tripod-integrated type of camera generally comprises a camera body 1 having a cylindrical shape which preferably is circular in cross section, a camera-body mounting member 21 which is groove-coupled with the camera body 1 as will be explained later, a hollow tripod body 2 having a cylindrical shape which is circular in cross section, similarly to that of the camera body 1, a tripod-body mounting member 22 which is united with the tripod body 2 as will be explained below and which is removably united with the camera-body mounting member 21 at the end face shown by a dot-dashed line A, and legs 3a, 3b and 3c having shoes 4a, 4b and 4c at their respective extending ends.

The camera body 1 comprises a receiver and related circuitry 25 for remote control operation spool compartment 6 having a spool 7, a film cartridge 5 accommodated in the spool compartment 6, a photographic lens system 8 disposed at an intermediate position between the film cartridge 5 and the spool 7, batteries 9 located on the side of the film cartridge 5 which is opposite to the photographic lens system 8, an electronic flash unit 10 and a viewfinder 11 both of which are located on the side of the spool compartment 6 which is opposite to the photographic lens system 8, and a film-feed gear train 12 disposed below the film cartridge 5 and the spool compartment 6 as viewed in FIG. 1(a).

The tripod body 2 includes tripod shafts 13a, 13b and 13c which pivotally support the legs 3a, 3b and 3c, respectively, and a tripod mounting member 14 provided with the tripod shafts 13a, 13b and 13c. The tripod mounting member 14 is arranged to be slidable along the length of the tripod body 2, thereby enabling the leg 3a, 3b and 3c to be moved into and out of the tripod body 2. Although not shown, the legs 13a, 13b and 13c are each provided with a spring which consistently urges the corresponding leg in an open tripod direction. The tripod body 2 also includes a hinge shaft 15 which pivotally unites the tripod-body mounting member 22 and the tripod body 2 so that the camera body 1 and the tripod body 2 can be relatively rotated in a plane approximately perpendicular to a photographic optical axis. A remote control transmitter 16 is removably attached to the camera body 1 at the end face shown by a dot-dashed line B.

Figure 3:
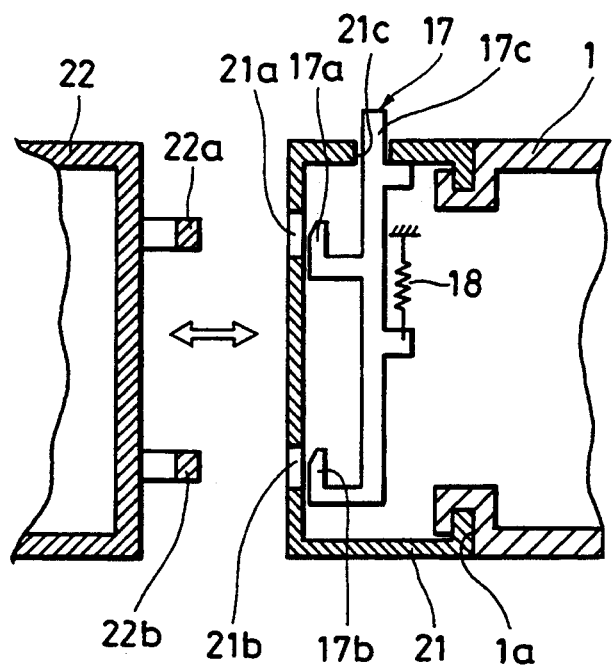
FIG. 3 is a diagrammatic cross-sectional view of a coupling arrangement for detachably attaching the camera body assembly to the tripod section of the camera shown in FIG. 1(a)

FIG. 3 shows a coupling arrangement for detachably attaching the tripod-body mounting member 22 to the camera-body mounting member 21 which is groove-coupled with the camera body 1. As illustrated, the camera body 1 has an annular groove 1a of rectangular cross section at the end face to be coupled with the camera-body mounting member 21. A flange, which is formed around the periphery of the open end of the camera-body mounting member 21, is frictionally secured to the annular groove 1a around the entire circumference in such a manner that the camera body 1 and the camera-body mounting member 21 can be rotated with respect to each other. The camera-body mounting member 21 includes an engagement lever 17 having engagement claws 17a and 17b, and coupling openings 21a and 21b are formed in the end wall of the camera-body mounting member 21 which faces the tripod-body mounting member 22, while a through-opening 21c is formed in the circumferential wall of the same. The engagement lever 17 is arranged to be slidable in the vertical direction as viewed in FIG. 3, i.e. in the direction parallel to the end face of the camera body 1. The engagement lever 17 is also consistently urged in the upward direction by return spring 18, i.e. toward the top of the circumferential wall of the camera-body mounting member 21 as viewed in FIG. 3, so that the engagement claws 17a and 17b are positioned adjacent to the corresponding coupling openings 21a and 21b with an operating end 17c projecting upward from the through-opening 21c.

Lock claws 22a and 22b project from the coupling end face of the tripod-body mounting member 22 which is positioned on the side of the camera-body mounting member 21. When the camera-body mounting member 21 and the tripod-body mounting member 22 are to be coupled to each other, a user may press the end face of the camera-body mounting member 21 against the coupling end face of the tripod-body mounting member 22 to insert the lock claws 22a and 22b through the respective coupling openings 21a and 21b formed in the camera-body mounting member 21, thereby engaging the lock claws 22a and 22b with the corresponding engagement claws 17a and 17b of the engagement lever 17. When the members 21 and 22 are to be detached from each other, the user may press the operating end 17c of the engagement lever 17 inwardly. In this manner, the tripod-body mounting member 22 can be attached and detached to and from the camera-body mounting member 21 by a simple operation.

Figure 4:
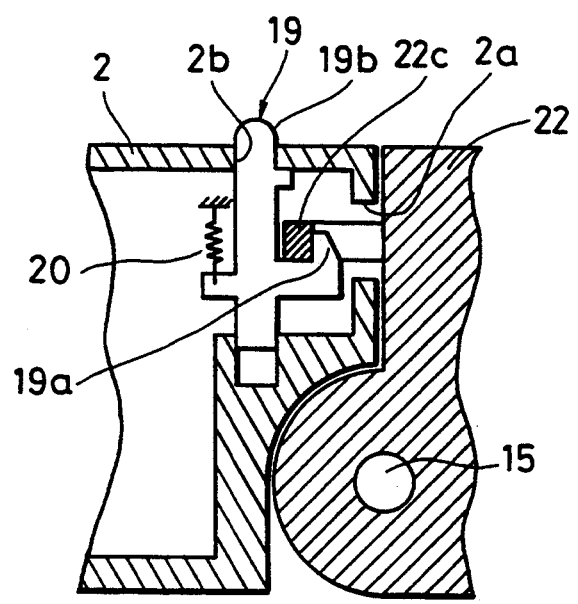
FIG. 4 is a diagrammatic cross-sectional view of a coupling mechanism in the hinge arrangement of the camera shown in FIG. 1(a)

FIG. 4 shows a hinge arrangement for hingedly coupling the tripod body 2 and the tripod-body mounting member 22. As illustrated, a lock claw 22c projects from the coupling face of the tripod-body mounting member 22 which provides coupling with the tripod body 2. An engagement lever 19 having an engagement claw 19a is disposed in the interior of the tripod body 2 at the end to be coupled to the tripod-body mounting member 22. A coupling opening 2a is formed in the coupling end wall of the tripod body 2 which provides coupling with the tripod-member mounting member 22, while a through-opening 2b is formed in the circumferential wall of the tripod body 2. An engagement lever 19 having an engagement claw 19a is disposed in the tripod body 2 at the end adjacent to the tripod-body mounting member 22. The engagement lever 19 is arranged to be slidable in the vertical direction as viewed in FIG. 4, i.e., in the direction parallel to the aforesaid coupling end wall. The engagement lever 19 is also consistently urged in the upward direction by return spring 20, i.e., toward the top of the circumferential wall of the tripod-body mounting member 22 as viewed in FIG. 4, so that the engagement claw 19a is positioned adjacent to the coupling opening 2a with an operating end 19b projecting upward from the through-opening 2b. When the user rotates the tripod-body mounting member 22 about the hinge shaft 15 to tightly engage the coupling end face of the tripod-body mounting member 22 with the corresponding end face of the tripod body 2, the lock claw 22c is brought into engagement with the engagement claw 19a of the engagement lever 19 through the coupling opening 2a formed in the end wall of the tripod body 2. If the user presses the operating end 19b of the engagement lever 19 inwardly, the tripod-body mounting member 22 and the tripod body 2 are disengaged from each other.

The operation of the first embodiment having the above-described arrangement will be explained below. If it is desired to unite the camera body 1 with the tripod body 2 as shown in FIG. 1 and perform photography with the camera held in a vertical position, the legs 3a, 3b and 3c as well as the tripod mounting member 14 are shifted in the tripod body 2 in the outward direction by drawing the shoes 4a, 4b and 4c outwardly. When the legs 3a, 3b and 3c are completely moved out of the tripod body 2, they are opened by the forces of their respective urging springs (not shown). The user may perform photography with the opened legs 3a, 3b and 3c held in position.

If it is desired to unite the camera body 1 with the tripod body 2 in a similar manner and perform photography with the camera held in the horizontal position, the operating end 19b of the engagement lever 19 is pressed inwardly to disengage the lock claw 22c from the tripod-body mounting member 22. The user may rotate the camera body 1 together with the tripod-body mounting member 22 through 90 degrees about the hinge shaft 15 as shown in FIG. 2 to perform photography with the camera held in position. If it is desired to adjust the angle of the camera body 1 with respect to an object in the vertical direction, the user may rotate the camera body 1 with respect to the camera-body mounting member 21, that is, about an axis parallel to the direction of film travel in the T or U direction as shown in FIG. 2.

As will be understood by those skilled in the art, any of the above-described photographic operations may be accomplished under remote control utilizing the remote control transmitter 16 detached from the camera body 1.

If it is desired to accommodate the legs 3a, 3b and 3c in the tripod body 2, the legs 3a, 3b and 3c are closed and moved into the tripod body 2 together with the tripod mounting member 14.

Figure 5:
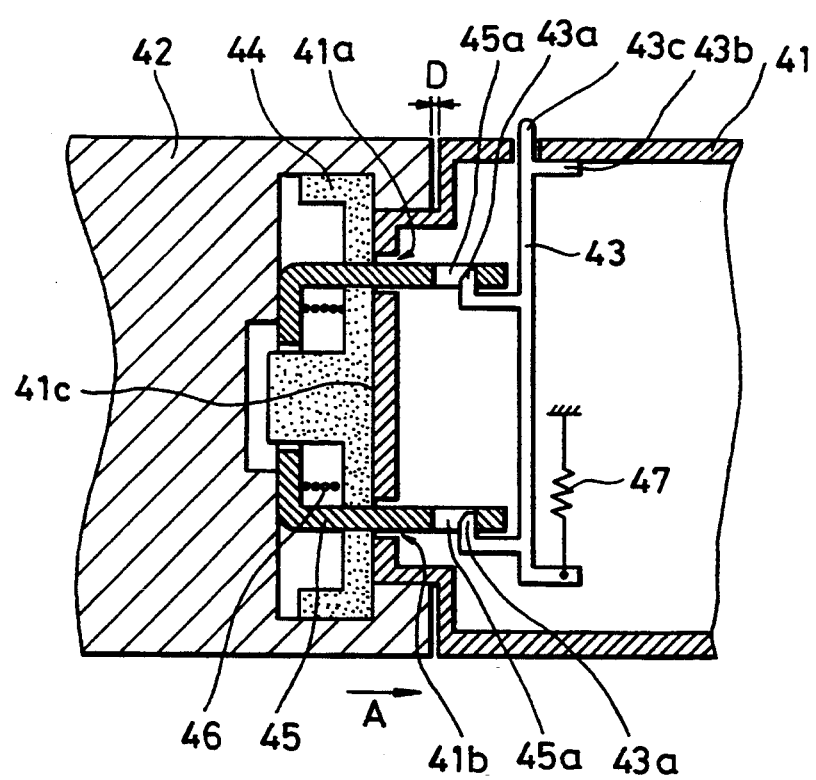
FIG 5 is a diagrammatic cross-sectional view similar to FIG. 3, but shows a coupling arrangement according to a second embodiment of the present invention.

FIG. 5 is a cross-sectional view similar to FIG. 3, but shows a second embodiment which utilizes another form of a coupling arrangement for detachably attaching a tripod-body mounting member to a camera-body mounting member. The arrangement shown in FIG. 5 comprises a camera body 41, a tripod-body mounting member 42 similar to the tripod-body mounting member 22 used in the first embodiment, an engagement lever 43 movable with respect to the camera body 41 in the vertical direction as viewed in the drawing, and an engagement member 45. The engagement lever 43 is consistently urged upwardly as viewed in the drawing by a return spring 47, and the engagement position of the engagement lever 43 is restricted by a stopper portion 43b.

When the tripod-body mounting member 42 is to be attached to the camera body 41, the respective leg portions of the engagement member 45 are inserted through coupling openings 41a and 14b formed in the camera body 41 to force the tripod-body mounting member 42 against the camera body 41. Thus, engagement claws 43a which project from the engagement member 43 are brought into engagement with corresponding engagement openings 45a formed in the respective leg portions of the engagement lever 43, whereby the tripod-body mounting member 42 and the camera body 41 are united with each other. If an operating end 43c of the engagement lever 43 is pressed downwardly as viewed in FIG. 5 in the state shown, the engagement claws 43a and the corresponding engagement openings 45a are disengaged from each other and the tripod-body mounting member 42 is detached from the camera body 41.

Figure 6:
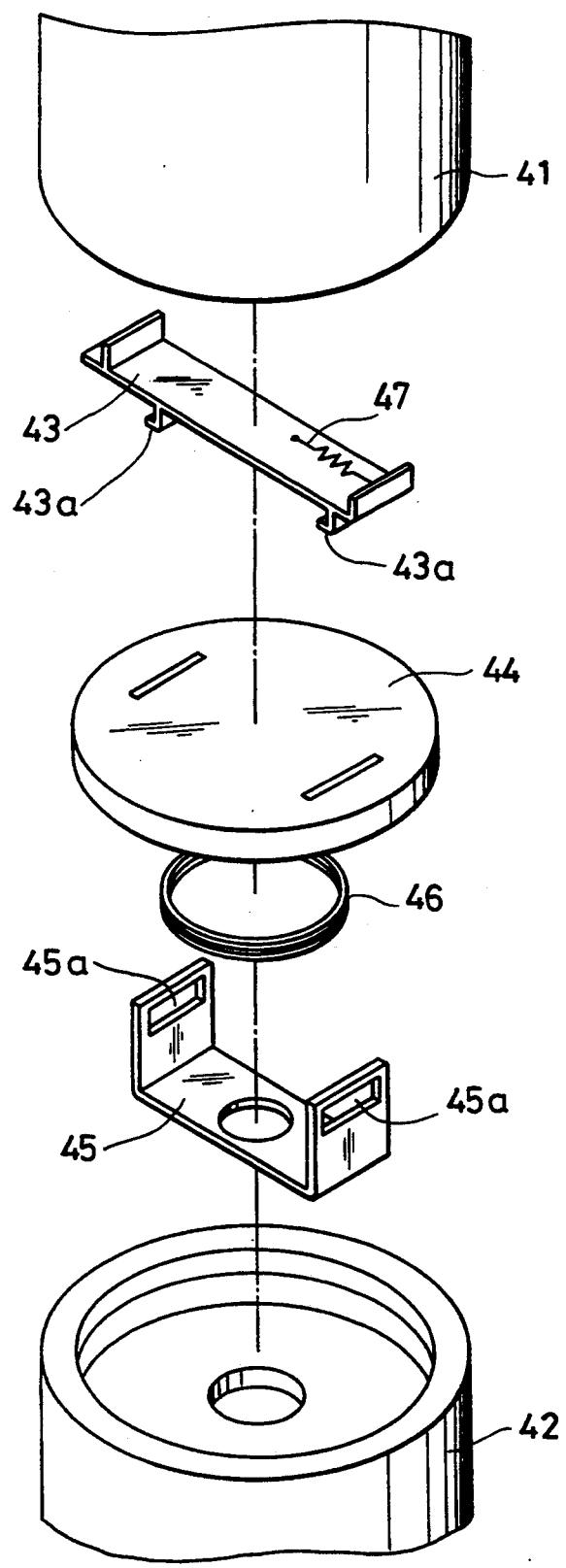
FIG. 6 is a diagrammatic perspective view showing the coupling arrangement of FIG. 5 in exploded form.

As is best understood from FIG. 6 which is a perspective view of the coupling arrangement shown in FIG. 5, a lid 44 has a circular shape, and is rotatably fitted into the inner periphery of the tripod-body mounting member 42 so as to serve as a displacement means.

A strong compression coil spring 46 is disposed between the lid 44 and the engagement member 45 to urge them in the direction away from each other.

In the above arrangement, when the tripod-body mounting member 42 is pressed in the direction of arrow A in order to attach the tripod-body mounting member 42 to the camera body 41, a contact surface 41c of the camera body 41 comes into contact with the lid 44 to press the lid 44 by an engagement margin D to the left as viewed in FIG. 5 against the urging force of the compression coil spring 46. Thus, the engagement claws 43a of the engagement lever 43 engage with the corresponding engagement openings 45a of the engagement member 45. After the engagement claws 43a have completely engaged with the respective engagement openings 45a, when the application of pressure in the direction of arrow A is stopped, the lid 44 is forced to the right by the urging force of the compression coil spring 46. In this manner, the looseness of the engagement between the tripod-body mounting member 42 and the camera body 41 is eliminated, and the tripod-body mounting member 42 is held in position with respect to the camera body 41. In this state of engagement, the camera body 41 and the tripod-body mounting member 42 can be rotated with respect to each other by means of the lid 44.

As is apparent from the foregoing explanation of the second embodiment, with the above coupling arrangement for detachably attaching the camera body to the tripod-body mounting member, it is possible to attach the tripod-body mounting member to the camera body in a step without substantial play along the axis of attachment. In addition, the camera body and the tripod-body mounting member can be united with each other by means of a remarkably simple and compact arrangement in such a manner that the camera body can be rotated with respect to the tripod-body mounting member about the axis parallel to the direction of film travel.

Figure 7:
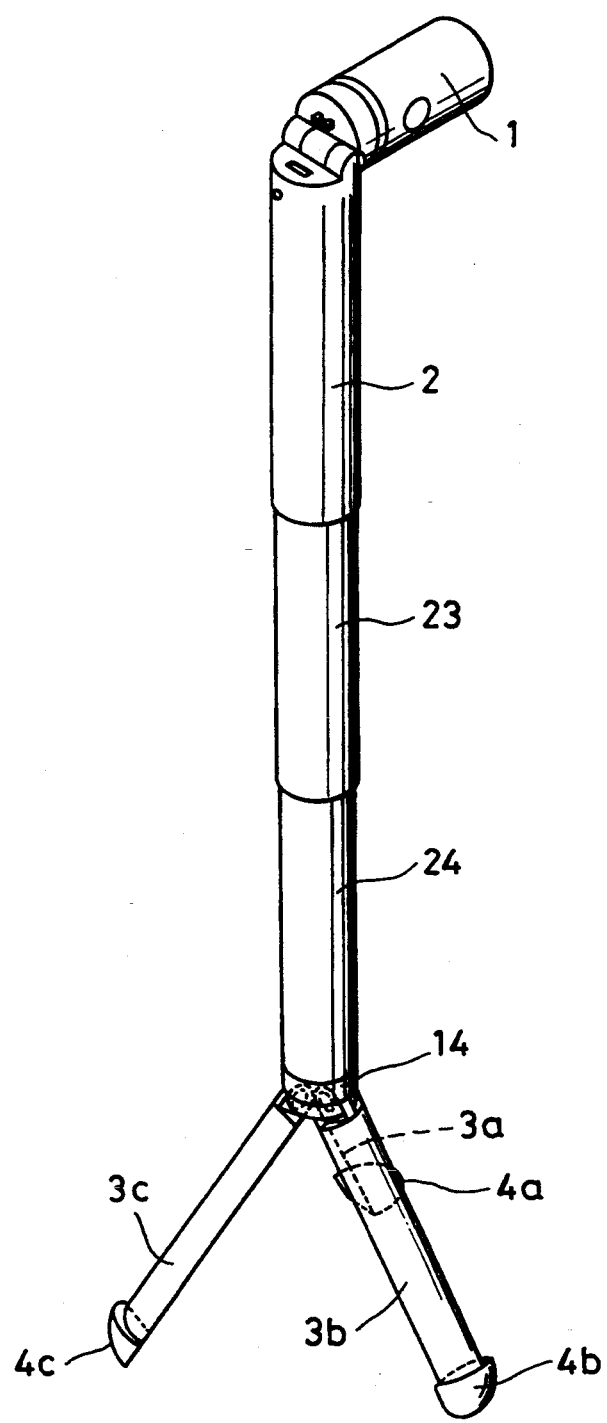
FIG. 7 is a diagrammatic perspective view showing in an upright position a third embodiment of a tripod-integrated type of camera according to the present invention.

FIG. 7 is a perspective view showing a third embodiment of the present invention. For the sake of simplicity, the same reference numerals are used to denote the same elements as those used in the first embodiment of FIG. 1, and only different elements will be explained below.

In the third embodiment, two hollow cylindrical members 23 and 24 are telescopically slidably fitted into the tripod body 2. The tripod mounting member 14 which pivotally supports the legs 3a, 3b and 3c is longitudinally slidably disposed in the innermost hollow cylindrical member 24. The arrangements of the other elements are substantially the same as those of the corresponding elements of the first embodiment shown in FIG. 1.

Figure 8:
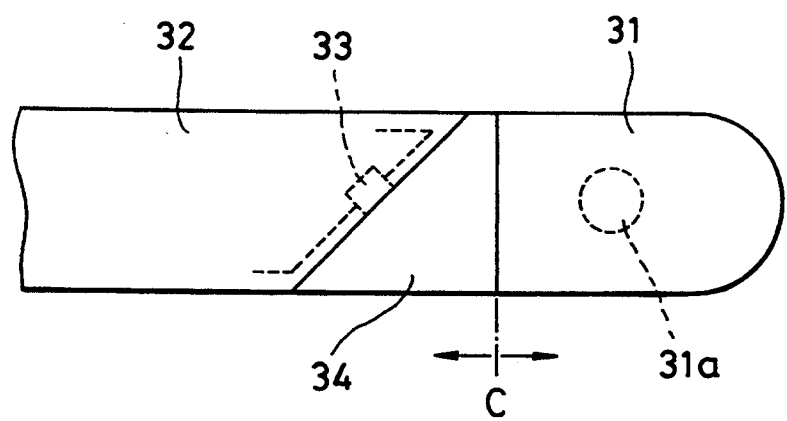
FIG 8(a) is a diagrammatic top plan view of the essential portion of a fourth embodiment of a tripod-integrated type of camera according to the present invention and shows the camera in a vertical photogaphic position.
FIG 8(b) is a view similar to FIG. 8(a), but shows the camera in a horizontal photographic position.
Figure 8:
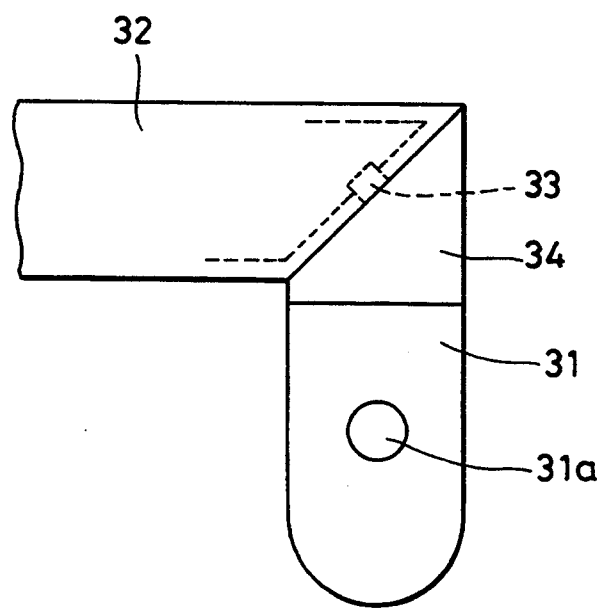

FIGS. 8(a) and 8(b) schematically show the essential portion of a fourth embodiment of the present invention.

In the fourth embodiment, the contact between a camera body 31 having a photographic lens 31a and a tripod body 32 is accomplished in a plane which crosses a cylinder at 45 degrees as shown. The camera body 31 and the tripod body 32 are united with each other so that they can be relatively rotated about a shaft 33. The camera body 31 is detachably attached to the tripod body 34 at the position shown by a dot-dashed line C. The coupling arrangement utilized in the fourth embodiment is substantially the same as that explained in connection with FIG. 3. Since the arrangements of the other elements are substantially the same as those the corresponding elements of the above embodiment, further explanation thereof is omitted here.

In the fourth embodiment, by rotating the camera body 31 through 180 degrees with respect to the tripod body 32, the camera can be shifted between the vertical photography position shown in FIG. 8(a) and the horizontal photography position shown in FIG. 8(b).

In accordance with each of the above-described embodiments, a tripod-integrated camera is provided with a tripod body assembly and a camera body assembly which can be attached to and detached from each other in a single step. When the tripod body assembly is attached to the camera body assembly, they form a substantially integral, compact cylinder extending along the length of the camera body assembly and having a circular shape in cross section. Accordingly, it is possible to easily carry the camera from one to another place with the tripod body assembly attached to the camera body assembly.

The tripod-integrated camera according to each of the embodiments further has the following advantages. Since the camera body assembly can be rotated through 90 degrees with respect to the tripod body assembly, the camera can be easily switched between the vertical photographic position and the horizontal photographic position. In addition, it is possible to easily adjust the angle of the camera body assembly with respect to an object in the vertical direction by means of the camera-body mounting member serving as an angle adjustment mechanism.

It is to be noted that the arrangement shown in each of FIGS. 3, 4 and 5 may be incorporated in either the camera body assembly or the tripod body assembly.

The present invention may also be applied not only to silver-salt film cameras but to electronic cameras, for example, the type using image recording media such as floppy disks.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An integrated camera-tripod system, comprising:
  a camera body assembly in which a camera is disposed; and
  a tripod body assembly in which a tripod is disposed, said tripod body assembly being detachably coupled to said camera body assembly;
  wherein said camera body assembly and said tripod body assembly are relatively movable, and wherein an exterior surface of said camera body assembly is in an angular relation with an exterior surface of said tripod body assembly when said system in an open state, and the exterior surfaces of said camera body assembly and said tripod body assembly form an elongated, contiguous exterior surface when said system in a closed state.

2. An integrated camera-tripod system according to claim 1, wherein said camera body assembly and said tripod body assembly are uniform in cross section.

3. An integrated camera-tripod system according to claim 1, wherein said camera body assembly includes means for coupling said tripod body assembly to said camera body assembly along an axis parallel to a direction of film travel.

4. An integrated Camera-tripod system according to claim 1, wherein said camera body assembly includes means for coupling said tripod body assembly to said camera body assembly along an axis parallel to the direction in which an image recording medium is transported.

5. An integrated camera-tripod system according to claim 4, further comprising means for supporting said camera body assembly rotatably with respect to said tripod body assembly about an axis approximately parallel to the direction in which an image recording medium is transported.

6. An integrated camera-tripod system according to claim 1, further comprising means for supporting said camera body assembly rotatably with respect to said tripod body assembly in a plane approximately perpendicular to a photographic optical axis of said camera body assembly.

7. An integrated camera-tripod system according to claim 6, further comprising means for supporting said camera body assembly rotatably with respect to said tripod body assembly about an axis approximately parallel to the direction in which an image recording medium is transported.

8. An integrated camera-tripod system according to claim 6, further comprising means for retaining said camera body assembly and said tripod body assembly in an elongated form when said tripod body assembly is attached to said camera body assembly.

9. An integrated camera-tripod system according to claim 1, further comprising means for coupling said camera body assembly with said tripod body assembly rotatably with respect to each other in a 45-degree plane in which an axis of said camera body assembly intersects that of said tripod body assembly.

10. An integrated camera-tripod system, comprising:
  a camera body assembly in which a camera is disposed;
  a tripod body assembly in which a tripod is disposed, said tripod body assembly being arranged to be detachably coupled to said camera body assembly, said tripod body assembly being coupled to said camera body assembly;
  wherein said camera body assembly and said tripod body assembly are relatively movable to form an elongated shape such that said tripod body assembly becomes substantially integral with said camera body assembly in a stored state; and
  wherein said tripod body assembly includes means for enabling said tripod body assembly to be telescopically operated.

11. An integrated camera-tripod system according to claim 1, further comprising coupling means for coupling said camera body to said tripod body assembly, said coupling means comprising:
  retaining means for retaining said camera body assembly and said tripod body assembly in position when said camera body assembly and said tripod body assembly are coupled to each other; and displacement means operative to be displaced with respect to said retaining means, thereby enabling the relative displacement of said camera body assembly and said tripod body assembly.

12. An integrated camera-tripod system according to claim 1, wherein said camera body assembly comprises a cylindrical body member.

13. An integrated camera-tripod system according to claim 12, wherein said cylindrical body member is circular in cross section.

14. An integrated camera-tripod system according to claim 1, wherein said camera is adapted for remote control operation and said camera body assembly comprises a removable remote control transmitter for remote operation of said camera.

15. An integrated camera-tripod system, comprising:
a camera body assembly in which a camera is disposed;
a tripod body assembly in which a tripod is disposed, said tripod body assembly being detachably coupled to said camera body assembly; and
coupling means for detachably coupling said tripod body assembly to said camera body assembly along an axis parallel to a direction in which a film is transported in said camera body assembly;
wherein said camera body assembly and said tripod body assembly are relatively movable, and wherein an exterior surface of said camera body assembly is in an angular relation with an exterior surface of said tripod body assembly when said system is in an open state, and the exterior surfaces of said camera body assembly and said tripod body assembly form an elongated, contiguous exterior surface when said system is in a closed state.

16. An integrated camera-tripod system according to claim 15, wherein said camera body assembly comprises a cylindrical body member.

17. An integrated camera-tripod system according to claim 16, wherein said cylindrical body member is circular in cross section.

18. An integrated camera-tripod system according to claim 15, further comprising coupling means for coupling said camera body to said tripod body assembly, said coupling means comprising:
retaining means for retaining said camera body assembly and said tripod body assembly in position when said camera body assembly and said tripod body assembly are coupled to each other; and
displacement means operative to be displaced with respect to said retaining means, thereby enabling the relative displacement of said camera body assembly and said tripod body assembly.

19. An integrated camera-tripod system according to claim 15, wherein said camera is adapted for remote control operation and said camera body assembly comprises a removable remote control transmitter for remote operation of said camera.

20. An integrated camera-tripod system, comprising:
a camera body assembly in which a camera is disposed;
a tripod body assembly in which a tripod is disposed, said tripod body assembly being arranged to be detachably coupled to said camera body assembly, wherein an exterior surface of said camera body assembly is in an angular relation with an exterior surface of said tripod body assembly when said system is in an open state, and the exterior surfaces of said camera body assembly and said tripod body assembly form an elongated, contiguous exterior surface when said system is in a closed state; and
a coupling device disposed between said camera body assembly and said tripod body assembly;
wherein said camera body assembly and said tripod body assembly are uniform in cross section.

21. A tripod-integrated camera, comprising:
a camera body assembly in which a camera is disposed;
a retracting tripod body assembly in which a tripod is disposed; and
a holder for holding said retracting tripod body assembly, said holder being arranged to be detachably coupled to said camera body assembly;
wherein said camera body assembly and said tripod body assembly are relatively movable to form an elongated shape such that the tripod body assembly becomes substantially integral with said camera body assembly in a stored state.

22. A tripod-integrated camera system according to claim 21, wherein said camera body assembly and said tripod body assembly are uniform in cross-section in the stored state.

23. A tripod-integrated camera according to claim 21, wherein said camera body assembly includes means for coupling said tripod body assembly to said camera body assembly along an axis parallel with a direction of film travel.

24. A tripod-integrated camera according claim 21, wherein said camera body assembly includes means for coupling said tripod body assembly to said camera body assembly along an axis parallel to a direction in which an image recording medium is transported.

25. A tripod-integrated camera according to claim 21, further comprising means for supporting said camera body assembly rotatably with respect to said tripod body assembly about an axis approximately parallel with the direction in which an image recording medium is transported.

26. A tripod-integrated camera according to claim 21, further comprising means for supporting said camera body assembly rotatably with respect to said tripod body assembly in a plane approximately perpendicular to a photographic optical axis of said camera body assembly.

27. A tripod-integrated camera according to claim 26, further comprising means for supporting said camera body assembly rotatably with respect to said tripod body assembly about an axis approximately parallel to the direction in which an image recording medium is transported.

28. A tripod-integrated camera according to claim 21, wherein said camera body assembly comprises a cylindrical body member.

29. A tripod-integrated camera according to claim 28, wherein said cylindrical body member is circular in cross section.

* * * * *

UNITED STATES PATENT AND TRADEMARK OFFICE
CERTIFICATE OF CORRECTION

PATENT NO. : 5,384,609
DATED : January 24, 1995
INVENTOR(S) : Yukio Ogawa, et al.

It is certified that error appears in the above-indentified patent and that said Letters Patent is hereby corrected as shown below:

COLUMN 1:

Line 2, "division," should be deleted.
Line 3, "No. 07/814,05" should read --No. 07/814,056--.
Line 20, "types" should read --type--.
Line 67, "camera" should read --camera body assembly rotatably with respect to the tripod section--.

COLUMN 2:

Line 1, "tion" should be deleted.
Line 67, "view" (second occurrence) should read --view showing the first embodiment, respectively. Fig. 2 is a--

COLUMN 5:

Line 54, "14b" should read --41b--.

COLUMN 7:

Line 5, "those" should read --those of--.

UNITED STATES PATENT AND TRADEMARK OFFICE
CERTIFICATE OF CORRECTION

PATENT NO. : 5,384,609
DATED : January 24, 1995
INVENTOR(S) : Yukio Ogawa, et al.

It is certified that error appears in the above-indentified patent and that said Letters Patent is hereby corrected as shown below:

COLUMN 8:

Line 2, "in" should read --is in--.
Line 11, "Camera-tripod" should read --camera-tripod--.
Line 65, "camera body" should read --camera body assembly--.

COLUMN 10:

Line 26, "system" should be deleted.

Signed and Sealed this

Second Day of May, 1995

BRUCE LEHMAN

*Attest:*

*Attesting Officer*    *Commissioner of Patents and Trademarks*